E. H. Corbin,
Circular Saw Jointer.
No. 109,806.   Patented Dec. 6, 1870.
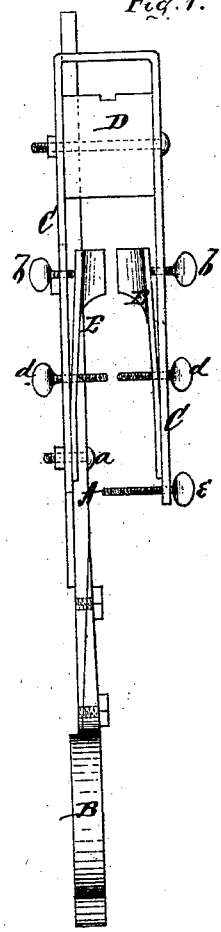
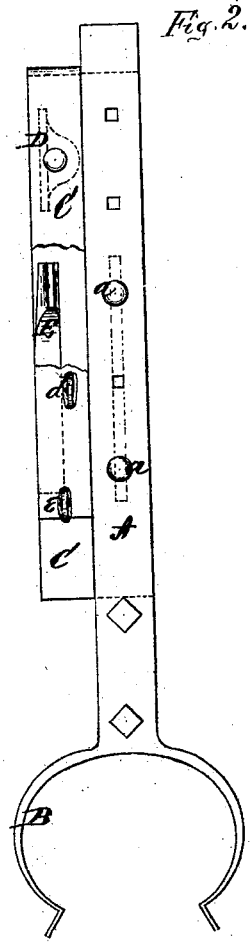
Witnesses:
Chas. Jacobs,
J. W. White
Inventor:
E. H. Corbin
per
J. H. Alexander
Atty

UNITED STATES PATENT OFFICE.

ELIJAH H. CORBIN, OF WINCHESTER, INDIANA.

IMPROVEMENT IN CIRCULAR-SAW JOINTERS.

Specification forming part of Letters Patent No. 109,806, dated December 6, 1870.

*To all whom it may concern:*

Be it known that I, ELIJAH H. CORBIN, of Winchester, in the county of Randolph and State of Indiana, have invented certain new and useful Improvements in Circular-Saw Jointer; and I do hereby declare that the following is a full, clear, and exact description thereof, reference being had to the accompanying drawings, and to the letters of reference marked thereon, which form a part of this specification.

The nature of my invention consists in the construction and arrangement of a circular-saw jointer, as will be hereinafter fully set forth.

In order to enable others skilled in the art to which my invention appertains to make and use the same, I will now proceed to describe its construction and operation referring to the annexed drawings, in which—

Figure 1 is a front view, and Fig. 2 a side view, of my machine.

A represents the main plate of my machine, at the lower end of which is attached a spring, B. This spring is attached or adjusted on the mandrel of the saw on the board side or inside next to the frame. To ascertain when the saw is round, after being adjusted as above, adjust the loop-block C, which is attached to the main plate A by means of bolts *a a*, which work in a slot in the loop-block, allowing the same to slide up or down to suit size of saw. In the upper end of the loop-block C there is a joint-block, D, fastened by means of a bolt. This joint-block is to be adjusted to the end of the shortest tooth in the saw by raising or lowering the loop-block to suit the size of the saw. The saw is then revolved inside of the loop-block, each tooth being cut with a file until it will pass the joint-block D in the upper part of the loop-block. When the jointer is thus adjusted and it is desired to set the teeth of the saw to an exact width, the springs E E, attached on the inside of the loop-block C, are adjusted to the width required for the set of the saw-teeth by means of the thumb-screws *b b* at the upper end of said springs. When so set, they remain stationary and the teeth are sprung to them. Then to ascertain when the teeth are set to the proper gage the saw is revolved inside of the loop-block C, each tooth touching the springs. The thumb-screws *d d* on either side of the loop-block and below the screws *b b*, that regulate the springs E E, are for the purpose of fastening the jointer permanently to the saw-plate. This is done by turning said screws until they become tight on the saw-plate. The thumb-screw *e* in the lower end of the loop-block and opposite the main plate is for the purpose of steadying the jointer, when adjusted to the saw-plate, by tightening the screw on the saw-plate.

Having thus fully described my invention, what I claim as new, and desire to secure by Letters Patent, is—

In combination with the adjustable loop-block C, the springs E E, adjusted by means of the thumb-screws *b b*, substantially as and for the purposes herein set forth.

In testimony that I claim the foregoing as my own invention I affix my signature in presence of two witnesses.

ELIJAH H. CORBIN.

Witnesses.
    LEANDER J. MONKS,
    MARTIN B. MILLER.